United States Patent
Wu et al.

(10) Patent No.: US 10,135,701 B2
(45) Date of Patent: Nov. 20, 2018

(54) CONTEXT-AWARE VIRTUALIZED CONTROL DECISION SUPPORT SYSTEM FOR PROVIDING QUALITY OF EXPERIENCE ASSURANCE FOR INTERNET PROTOCOL STREAMING VIDEO SERVICES

(71) Applicant: AT&T Intellectual Property I, L.P., Atlanta, GA (US)

(72) Inventors: Tsong-Ho Wu, Englishtown, NJ (US); Wen-Jui Li, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 298 days.

(21) Appl. No.: 15/048,159

(22) Filed: Feb. 19, 2016

(65) Prior Publication Data
US 2017/0244614 A1    Aug. 24, 2017

(51) Int. Cl.
*G06F 15/173* (2006.01)
*H04L 12/24* (2006.01)
(Continued)

(52) U.S. Cl.
CPC ...... *H04L 41/5067* (2013.01); *H04L 41/0631* (2013.01); *H04L 43/0876* (2013.01);
(Continued)

(58) Field of Classification Search
CPC ............. H04L 41/5067; H04L 43/0876; H04L 47/762; H04L 67/327; H04L 41/0631; H04L 45/64
(Continued)

(56) References Cited

U.S. PATENT DOCUMENTS 7,197,557 B1 * 3/2007 Asar ................... H04L 41/5009
                                                        707/999.103
9,225,652 B2   12/2015 Li et al.
(Continued)

OTHER PUBLICATIONS

International Search Report and Written Opinion dated May 12, 2017 in International Application No. PCT/US2017/018302.
(Continued)

*Primary Examiner* — Philip Chea
*Assistant Examiner* — Wing Ma
(74) *Attorney, Agent, or Firm* — Hartman & Citrin LLC

(57) ABSTRACT

Concepts and technologies disclosed herein are directed to context-aware virtualized control decision support system ("DSS") for providing quality of experience ("QoE") assurance for Internet protocol ("IP") streaming video services. A QoE assurance DSS can monitor QoE event and context data to be utilized for QoE assurance analytics, measure QoE performance, perform QoE assurance analytics, and determine whether the QoE assurance analytics indicate that the QoE has been degraded, and if so, construct a fault correlation information model to be utilized for root cause analysis to determine a root cause of the QoE being degraded. The QoE assurance DSS also can determine, based upon the fault correlation information model, whether the root cause of the QoE being degraded is due to a capacity reduction, and if so, the QoE assurance DSS can identify a new network resource for capacity reallocation to accommodate a virtual machine migration.

20 Claims, 9 Drawing Sheets

(51) Int. Cl.
*H04L 29/08* (2006.01)
*H04L 12/715* (2013.01)
*H04L 12/923* (2013.01)
*H04L 12/26* (2006.01)

(52) U.S. Cl.
CPC ............ *H04L 45/64* (2013.01); *H04L 47/762* (2013.01); *H04L 67/327* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 9,729,623 | B2* | 8/2017 | Huang | H04L 67/1014 |
| 9,799,017 | B1* | 10/2017 | Vermeulen | G06Q 20/145 |
| 2006/0206941 | A1* | 9/2006 | Collins | H04L 63/1425 |
| | | | | 726/25 |
| 2010/0027420 | A1 | 2/2010 | Smith | |
| 2011/0131335 | A1* | 6/2011 | Spaltro | G06F 9/5072 |
| | | | | 709/228 |
| 2013/0159498 | A1 | 6/2013 | Funge et al. | |
| 2013/0198767 | A1* | 8/2013 | Wang | H04L 65/80 |
| | | | | 725/14 |
| 2013/0212440 | A1 | 8/2013 | Rom et al. | |
| 2013/0215215 | A1 | 8/2013 | Gage et al. | |
| 2013/0238534 | A1* | 9/2013 | Nagaraj | H04L 41/04 |
| | | | | 706/12 |
| 2013/0326551 | A1 | 12/2013 | Chatterjee et al. | |
| 2013/0343222 | A1* | 12/2013 | Chen | H04L 41/5038 |
| | | | | 370/252 |
| 2014/0068348 | A1* | 3/2014 | Mondal | H04L 41/16 |
| | | | | 714/45 |
| 2014/0188829 | A1* | 7/2014 | Ranganathan | G06F 17/30289 |
| | | | | 707/705 |
| 2014/0233389 | A1 | 8/2014 | Bantukul et al. | |
| 2015/0033276 | A1 | 1/2015 | Khasnabish et al. | |
| 2015/0052246 | A1 | 2/2015 | Kordasiewicz et al. | |
| 2015/0113100 | A1 | 4/2015 | Tweedale et al. | |
| 2015/0127805 | A1 | 5/2015 | Htay et al. | |
| 2015/0172345 | A1 | 6/2015 | Mantin et al. | |
| 2015/0195178 | A1* | 7/2015 | Bhattacharya | H04L 45/745 |
| | | | | 718/1 |
| 2015/0358248 | A1 | 12/2015 | Saha et al. | |
| 2015/0378774 | A1* | 12/2015 | Vermeulen | G06F 9/466 |
| | | | | 707/703 |
| 2015/0378775 | A1* | 12/2015 | Vermeulen | G06F 9/466 |
| | | | | 707/692 |
| 2015/0379062 | A1* | 12/2015 | Vermeulen | G06F 17/30368 |
| | | | | 707/691 |
| 2015/0379099 | A1* | 12/2015 | Vermeulen | H05K 999/99 |
| | | | | 707/634 |
| 2016/0028645 | A1* | 1/2016 | Hohn | H04L 41/064 |
| | | | | 709/224 |
| 2016/0070589 | A1* | 3/2016 | Vermeulen | G06F 9/466 |
| | | | | 711/153 |
| 2016/0070771 | A1* | 3/2016 | Vermeulen | G06F 17/30575 |
| | | | | 707/687 |
| 2016/0085772 | A1* | 3/2016 | Vermeulen | G06F 17/30289 |
| | | | | 707/615 |
| 2016/0086260 | A1* | 3/2016 | Vermeulen | G06Q 40/00 |
| | | | | 705/35 |
| 2016/0174081 | A1* | 6/2016 | Lau | H04W 24/02 |
| | | | | 455/457 |
| 2017/0091227 | A1* | 3/2017 | Vermeulen | G06F 17/30283 |
| 2017/0142450 | A1* | 5/2017 | Ghosal | H04N 21/2187 |
| 2017/0201432 | A1* | 7/2017 | Balakrishnan | H04L 43/04 |
| 2018/0047002 | A1* | 2/2018 | Vermeulen | G06Q 20/145 |

OTHER PUBLICATIONS

Aggarwal et al., "Optimizing Cloud Resources for Delivering IPTV Services through Virtualization," Fourth International Conference on Communication Systems and Networks (COMSNETS 2012), Jan. 3-7, 2012, IEEE.

Paganelli et al., "Context-Aware Service Composition and Delivery in NGSONs over SDN," IEEE Communications Magazine, Aug. 2014, pp. 97-105, IEEE.

* cited by examiner

CONTEXT-AWARE VIRTUALIZED CONTROL DECISION SUPPORT SYSTEM FOR PROVIDING QUALITY OF EXPERIENCE ASSURANCE FOR INTERNET PROTOCOL STREAMING VIDEO SERVICES

BACKGROUND

Over-the-top ("OTT") content services are services that deliver content over the Internet without involvement of multiple system operators in the control or distribution of the content. OTT content services are becoming increasingly popular, particularly in video content distribution through streaming video services such as NETFLIX, HULU, AMAZON VIDEO, and the like. Traditional cable and satellite service providers have felt the impact of these streaming video services on their market share and for this reason are investigating ways to offer their own OTT content services.

Mobile telecommunications service providers, such as AT&T, are in a unique position to offer mobile streaming OTT video services. For these services to be successful, mobile telecommunications service providers must optimize customer experience quality, particularly with regard to a metric known as video rebuffering frequency ("VRF"). VRF is the frequency with which video is rebuffered. OTT streaming video is supported via hypertext transfer protocol ("HTTP") (i.e., Web) over transfer control protocol ("TCP") (i.e., OTT Video). A video rebuffering action will be triggered when TCP throughput is lower than the playback rate due to some capacity reduction and/or network impairment events, such as packet loss and reordering. The video playback will pause and wait for new video data, which triggers video rebuffering. Video rebuffering can lead to decreased quality of experience ("QoE") for users and might result in greater user churn.

SUMMARY

Concepts and technologies disclosed herein are directed to context-aware virtualized control decision support system ("DSS") for providing QoE assurance for Internet protocol ("IP") streaming video services. QoE can be measured as the frequency of video rebuffering during video playback being below a designated threshold value. The QoE is said to be degraded if the frequency of video rebuffering is equal to or above a designed threshold value.

According to one aspect disclosed herein, a QoE assurance DSS includes one or more processors and one or more memory components. The memory can store a plurality of modules that include instructions executable by the processor to cause the QoE assurance DSS to perform operations. The QoE assurance DSS can monitor, via a QoE data monitor module of the plurality of modules, QoE event data and context data to be utilized for QoE assurance analytics. The QoE assurance DSS can measure, via a QoE measurer module of the plurality of modules, QoE performance based upon the QoE event data. The QoE assurance DSS can perform, via a QoE assurance analyzer module of the plurality of modules, the QoE assurance analytics. The QoE assurance DSS can determine, via the QoE assurance analyzer module, whether the QoE assurance analytics indicate that the QoE has been degraded. In response to determining that the QoE has been degraded, the QoE assurance DSS can construct, via the QoE assurance analyzer module, a fault correlation information model to be utilized for root cause analysis to determine a root cause of the QoE being degraded. The QoE assurance DSS can determine, by the QoE assurance analyzer module, based upon the fault correlation information model, whether the root cause of the QoE being degraded is due to a capacity reduction. In response to determining that the root cause of the QoE being degraded is due to the capacity reduction, the QoE assurance DSS can identify, by the QoE assurance analyzer module, a new network resource for capacity reallocation to accommodate a virtual machine migration to improve QoE performance.

In some embodiments, the event data includes data associated with a virtual machine entering a suspend state, an application threshold-crossing alarm ("TCA") event data when the HTTP/TCP throughput is detected to be lower than a device's video playback rate, and a hardware host TCA event data when the capacity utilization of hardware hosts exceed a designated threshold. The event data for virtual machine ("VM") suspension and hardware host TCA events is network layer event data. The event data for application TCA events is application layer event data. In some embodiments, the context data includes virtual network topology data and performance metrics of hardware hosts.

In some embodiments, the QoE assurance DSS can determine whether the QoE assurance analytics indicate that the QoE has been degraded based upon whether a VRF is greater than or equal to a VRF threshold. If so, the QoE assurance DSS determines that the QoE has been degraded.

In some embodiments, the QoE assurance DSS can generate, by a QoE assurance reporter module of the plurality of modules, an alert directed to a software-defined network ("SDN") controller. In some embodiments, the alert can include a recommendation that identifies the new network resource for capacity reallocation to accommodate the VM migration. The QoS DSS can send the alert to the SDN controller so that the SDN controller can initiate the virtual machine migration to the new network resource identified in the recommendation.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
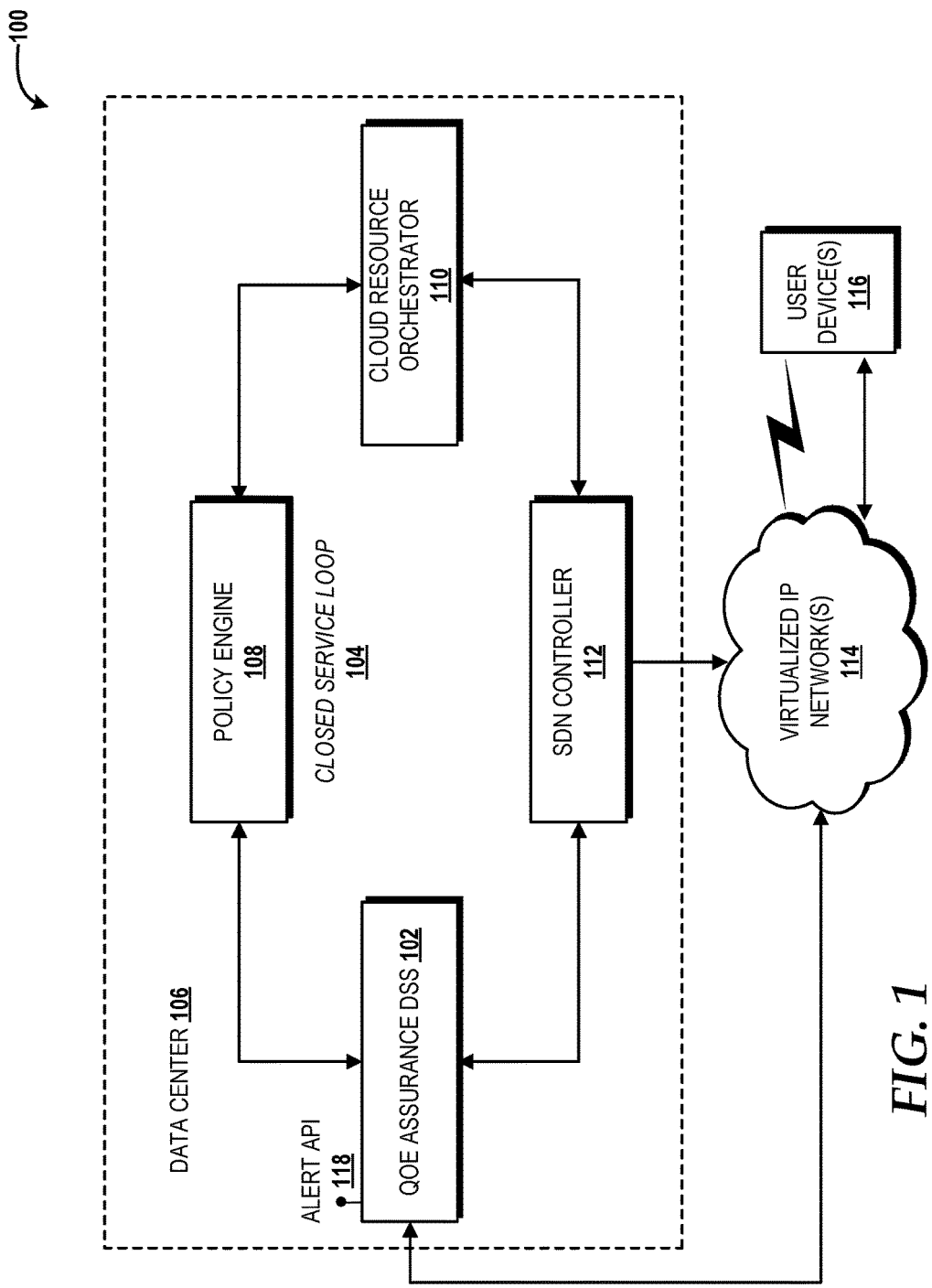
FIG. 1 is a block diagram illustrating an operating environment in which aspects of the concepts and technologies disclosed herein can be implemented.

A goal of the concepts and technologies disclosed herein is to provide a context-aware virtualized control DSS for providing QoE assurance for IP streaming video services to sustain an acceptable QoE under network capacity reduction conditions. In SDN/NFV environments, a rebuffering action often occurs as a result of a VM freeze. The VM, in these instances, supports the virtualized network function ("VNF") for a streaming video service and a VM freeze will likely continue (i.e., keep rebuffering) under network capacity reduction conditions. In current operations environments, a most common practice is to "reset and restart" the VM when frozen. This practice, however, can cause significant user service disruptions. For example, it could take several minutes (e.g., 10-30 minutes) to restart the VM depending upon the VM configuration and size.

To resolve this service disruption issue and to improve customer experiences, one approach is to use a VM live migration feature that facilitates movement of a running VM between different physical hardware hosts. VM live migration can take tens of seconds to a minute. In this case, an SDN controller can initiate resource re-allocation by migrating the subject VM to another host that has a higher capacity to support application requirements based on real-time VNF performance monitoring with streaming analytics to decide when to trigger VM live migration and where to allocate hardware host supporting VM migration in order to sustain VRF under a predetermined design threshold.

According to one aspect of the concepts and technologies disclosed herein, a context-aware virtualized control DSS is utilized to improve streaming video customer experiences under capacity reduction events via context-aware streaming QoE monitoring, analytics, and VM live migration. According to another aspect of the concepts and technologies disclosed herein, a monitored network and context dataset is utilized to measure QoE in terms of video rebuffering frequency ("VRF"). According to another aspect of the concepts and technologies disclosed herein, a unified modeling language ("UML")-based fault correlation information model is provided. The fault correlation information model enables automation of QoE assurance to determine a root cause of capacity reduction events and VM migration triggers via correlation rules and a dependency graph of objects across application VNFs, VMs, and hardware host platforms. According to another aspect of the concepts and technologies disclosed herein, a correlation rule set defines when and where VM migration should be triggered to assure a predetermined level of QoE for video streaming services.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Referring now to FIG. 1, a block diagram illustrating an operating environment 100 in which aspects of the concepts and technologies disclosed herein can be implemented will be described. The operating environment 100 shows the role of a QoE assurance DSS 102 in a closed service loop 104 utilized in a policy-driven SDN network operating, at least in part, in one or more data centers, such as data center 106 in the illustrated example. The data center 106 can include a plurality of hardware resources upon which the SDN network can operate. Additional details in this regard are provided in FIGS. 6-8. The closed service loop 104 is designed to provide QoE assurance for video streaming services provided, at least in part, by a communications service provider.

The entities involved in the illustrated closed service loop 104 include the QoE assurance DSS 102, a policy engine 108, a cloud resource orchestrator 110, and an SDN controller 112. The data center 106 is in communication with one or more virtualized IP networks 114. In the illustrated example, the QoE assurance DSS 102 and the SDN controller 112 are shown as being in communication with the virtualized IP network(s) 114. It should be understood, however, that other configurations are contemplated in which any of the aforementioned entities can be configured to be in communication with the virtualized IP networks 114. The virtualized IP networks 114 provide one or more user devices 116 with wireless and/or wired connectivity to the data center 106 so that the user device 116 can access one or more IP services, such as an IP streaming video service.

The QoE assurance DSS 102 can provide real-time recommendations for the timing and resource reallocation utilized in VM live migration when necessary to assure application-layer VRF remains under a predetermined design threshold. The threshold can be based upon a value for VRF that is deemed acceptable from a customer experience best-practice perspective, and as such, can be defined, for example, by a communications service provider that is providing the video streaming service. VM live migration facilitates the movement of running VMs from one physical hardware host (e.g., a blade of a server) to another (e.g., within a server cluster in the same server) with no impact on VM availability for providing, at least in part, the video streaming service to the user(s) of the user device(s) 116. The QoE assurance DSS 102 can utilize one or more open protocols, such as OPENFLOW, available from Open Network Forum.

The QoE assurance DSS 102 can monitor network and application performance metrics and event data related to QoE measurements. The QoE assurance DSS 102 can utilize the QoE measurements to determine whether network performance meets or exceeds a QoE measurement threshold.

The QoE assurance DSS 102 also can determine the timing and scope of triggering QoE enforcement if the current performance metrics do not meet QoE threshold requirements. The QoE assurance DSS 102 can trigger QoE enforcement through an alert API 118 to instruct the policy engine 108 to update policy and/or to instruct the SDN controller 112 to reallocate network resources, depending on network design. Additional details regarding the QoE assurance DSS 102 will be described herein below with reference to FIG. 3.

The policy engine 108 can establish and update policies for capacity management. Policies are utilized to instruct the cloud resource orchestrator 110 to allocate or reallocate cloud resources to meet user service requirements. The cloud resource orchestrator 110 can orchestrate cloud resource allocation between service requirements and network resource requirements managed by the SDN controller 112. The SDN controller 112 can instruct SDN network nodes to program node hardware for hardware resource allocation/reallocation in the virtualized IP network(s) 114.

According to various embodiments, the functionality of the user device(s) 116 may be provided by one or more server computers, desktop computers, mobile devices, laptop computers, tablet computers, set-top boxes, other computing systems, and the like. It should be understood that the functionality of the user device(s) 116 can be provided by a single device, by two similar devices, and/or by two or more dissimilar devices. For purposes of describing the concepts and technologies disclosed herein, the user device(s) 116 are described herein as mobile devices such as smartphones. It should be understood that this embodiment is illustrative, and should not be construed as being limiting in any way.

The user device(s) 116 are not part of the closed service loop 104. The QoE assurance DSS 102, however, is designed to track the video playback rate of the user device(s) 116 to determine whether QoE performance in terms of VRF has reached an unacceptable level. The video playback rate is assumed to be a constant for each of the user devices 116. The constant value of the video playback rate can be set by a user, a manufacturer of the user device(s) 116, a communications service provider, or another entity.

Figure 2:
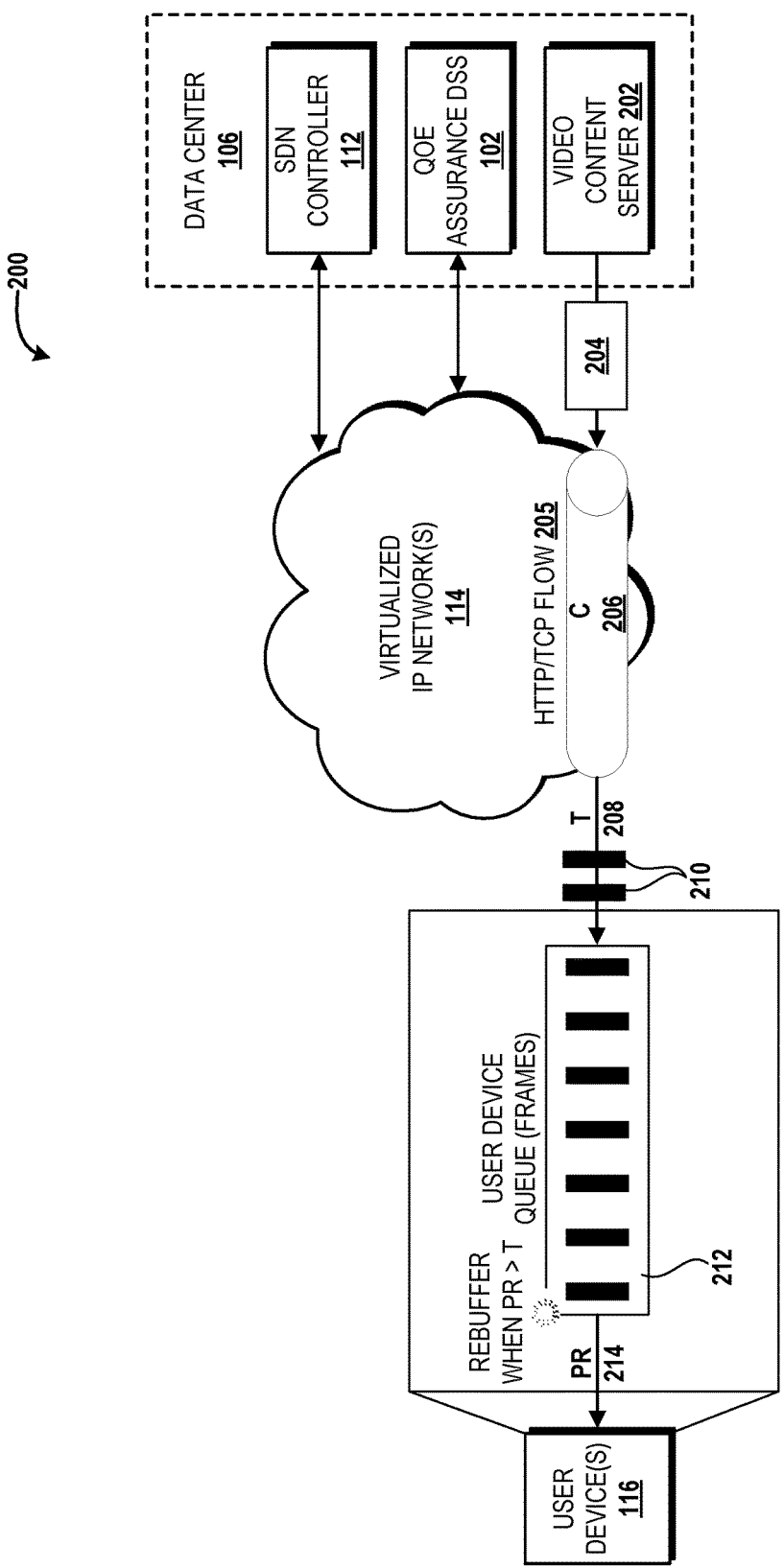
FIG. 2 is a block diagram illustrating aspects of a simplified streaming video operations and control framework, according to an illustrative embodiment.

Turning now to FIG. 2, a block diagram illustrating aspects of a simplified streaming video operations and control framework ("the video operations and control framework") 200 will be described, according to an illustrative embodiment. The video operations and control framework 200 includes the data center 106, introduced in FIG. 1, which, in turn, includes the SDN controller 112 and the QoE assurance DSS 102, also introduced in FIG. 1, and a video content server 202, each operating in communication with the virtualized IP network(s) 114. The video content server 202 stores video content 204 for distribution to the user devices 116 in an on-demand or live manner as part of a video streaming service. The illustrated virtualized IP network(s) 114 include HTTP/TCP flow 205 having a TCP flow capacity ("C") 206 (across VM-hardware host in topology configuration) and having a throughput ("T") 208 performance metric of video packets 210 of the video content 204. The user device(s) 116 can include a user device queue 212 having a video playback rate ("PR") 214.

For a video streaming service, one measure of customer experience quality is VRF. OTT streaming video is supported via HTTP (i.e., Web) over TCP (i.e., OTT Video). When the HTTP/TCP throughput ("T") 208 is lower than the video playback rate ("PR") 214 of the corresponding user device 116, playback will pause and wait for new video data, resulting in video rebuffering, and a threshold-crossing alarm ("TCA") event will be generated as application layer event data and sent to the QoE assurance DSS 102 for analysis. In the meantime, an event alarm in response to VM suspension due to video rebuffering can be generated as network layer event data and sent to the QoE assurance DSS 102 for analysis. To ensure the VM suspension (network layer event alarm) is due to TCA (application alarm), the number of VM suspension events should be equal to the number of TCA events in a QoE measurement period.

A video rebuffering event might be due, for example, to capacity reduction and/or network impairment events, such as packet loss and/or reordering. The concepts and technologies disclosed herein focus on capacity reduction events that cause video rebuffering and the use of VM migration control to reallocate network resources to improve QoE performance. Thus, a goal of the concepts and technologies disclosed herein is to design a streaming context-aware closed-loop virtualized control decision support system (illustrated as the QoE assurance DSS 102) to sustain an acceptable QoE under network capacity reduction conditions. It should be understood, however, that the concepts and technologies disclosed herein can be made applicable to other conditions that reduce QoE below a designed threshold.

Figure 3:
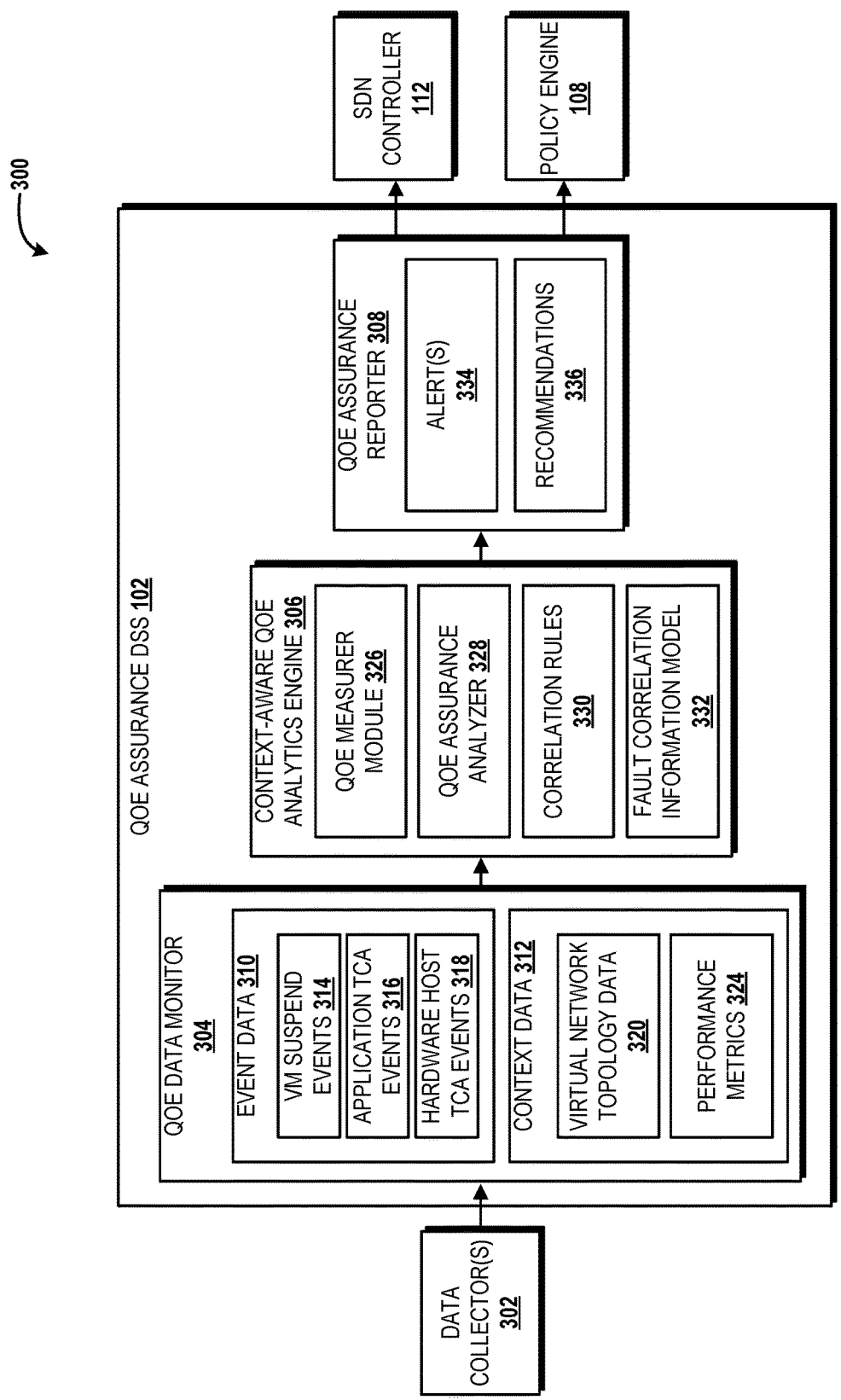
FIG. 3 is a block diagram illustrating aspects of a context-aware QoE assurance DSS functional framework, according to an illustrative embodiment.

Turning now to FIG. 3, a block diagram illustrating aspects of a context-aware QoE assurance DSS functional framework 300 ("QoE assurance DSS functional framework 300") will be described, according to an illustrative embodiment. The QoE assurance DSS functional framework 300 includes one or more data collectors 302 that collect data from the virtualized IP network(s) 114 (best shown in FIGS. 1 and 2) and provide the collected data to the QoE assurance DSS 102. The QoE assurance DSS 102, in turn, reports to the SDN controller 112 and/or the policy engine 108 to assure QoE for video streaming services. The data collectors 302, in some embodiments, can include databases, such as APACHE CASSANDRA databases, the like, or some combination thereof.

The illustrated QoE assurance DSS 102 includes a QoE data monitor 304, a context-aware QoE analytics engine 306, and a QoE assurance reporter 308. The QoE data monitor 304, the context-aware QoE analytics engine 306, and the QoE assurance reporter 308 can be software modules executable by one or more processors of the QoE assurance DSS 102, or, alternatively, the QoE data monitor 304, the context-aware QoE analytics engine 306, and the QoE assurance reporter 308 can be implemented via separate hardware systems, each including one or more processors, and having corresponding software modules executable by the processor(s), that collectively form the QoE assurance DSS 102.

The QoE data monitor 304 can monitor and extract event data 310 and context data 312 from one or more of the data collectors 302 to be utilized for QoE assurance analytics. The event data 310 can include data associated with one or more VM suspend events 314 at the network layer that causes a state change to one or more VMs, one or more application TCA events 316 at the application layer that detects network throughput T 208 (shown in FIG. 2) is lower than device's video playback rate PR 214 (also shown in FIG. 2), and hardware host TCA events 318 that the capability utilization of the hardware host exceeds the designated threshold. For example, the VM suspend events 314 can include a VM suspend state in which execution processes of a VM are suspended. The context data 312 can include virtual network topology data 320 and performance metrics 324. The virtual network topology data 320 can include a network topology that identifies associations among VNFs, VMs, and hardware hosts within one or more of the virtualized IP networks 114 (shown in FIGS. 1 and 2). The performance metrics 324 can include capacity utilization data of the hardware hosts, such as CPU, memory, and network cards, or the systems that include these components.

The illustrated context-aware QoE analytics engine 306 includes a QoE measurer module 326. The QoE measurer module 326 can measure performance of QoE in terms of VRF based upon the event data 310 and the context data 312 received from the QoE data monitor 304. A video rebuffering state is defined herein as a TCP throughput (e.g., T 208 in FIG. 2) being less than a device video playback rate (e.g., PR 214 in FIG. 2). This results in the VM serving the video streaming service to enter into a suspend state. The QoE measurer module 326 can count the number of VM operations entering into a suspend state. The QoE measurer module 326 can consider a network topology hierarchy (i.e., associations among VNFs, VMs, and hardware hosts) derived from the virtual network topology data 320. The QoE measurer module 326 can consider capacity reduction events wherein the capacity utilization data has reached a capacity utilization threshold. The QoE measurer module 326 can consider network performance alarms such as when the TCP throughput has reached a TCP throughput threshold.

The context-aware QoE analytics engine 306 also includes a QoE assurance analyzer 328. The context-aware QoE analytics engine 306 can determine whether QoE has been degraded below a predetermined threshold. If the QoE assurance analyzer 328 determines that QoE has been degraded, the QoE assurance analyzer 328 triggers an alert 334 (via the alert API 118 best shown in FIG. 1) to the SDN controller 112 through the QoE assurance reporter 308 to trigger network resource reallocation for VM migration to improve QoE performance. The QoE assurance reporter 308 can generate the alert(s) 334 and recommendation(s) 336. The recommendation(s) 336 can be directed to the SDN controller 112 and/or to the policy engine 108 to recommend when and where network resources should be reallocated to improve QoE performance in response to the QoE degradation identified by the QoE assurance analyzer 328 and the subsequent alert.

The context-aware QoE analytics engine 306 also includes correlation rules 330 that can include a list of correlation rules using the sequential if-then rule format that jointly effectively describe the means by which the root cause can be determined from symptoms reported by various inputting systems within the cloud SDN context. The correlation rules 330, in some embodiments, are based upon the Incident, State, Analysis and Action ("ISAA") model on a network function supported by a physical/virtual network topology model. When a fault incident is detected, the ISAA approach will correlate related event alarms with relevant context information and identify the root cause. For example, the correlation rules 330 can specify a rule set that can track root cause of VM suspend (the operation purpose) and TCA alarm events (signature detection) based upon the event data 310 and context data 312.

The correlation rules 330 can define conditions that should be met to detect QoE threshold crossing due to capacity reduction events. The correlation rules 330 can define a condition under which VNF TCP throughput is greater than 0 and less than T1 (0<VNF TCP throughput<T1), where T1=video playback rate (frames/second). A VNF TCP throughput greater than >0 indicates that no connection has been lost. The correlation rules 330 can define a condition under which the number of VMs entering suspension states is equal to N(VRF) (# of VMs entering suspension states=N(VRF)), where N(VRF) is equal to a threshold of VRF. The correlation rules 330 can define a condition when capacity utilization of a hardware host is less than a utilization threshold (capacity utilization of hardware host>T(U)), where this hardware host supports VM(s) carrying VNF(s) for streaming video of interest. VM live migration is triggered if the above QoE threshold-crossing condition is detected.

The fault correlation information model 332 is an object-oriented data model shared by service assurance subsystems of a cloud SDN that, at a given time, represents the cloud SDN network topology and service view. The fault correlation information model 332, in some embodiments, can be implemented using object-oriented UML data model for automating correlation engine construction or reconstruction for fault root cause analysis. Managed objects in the fault correlation information model 332 can include an event object class (e.g., VM suspend event), context data object class (e.g., virtual network topology), correlation rule objects and root cause analytics objects. An illustrative example of the fault correlation information model 332 is illustrated and described with reference to FIG. 6.

Figure 4:
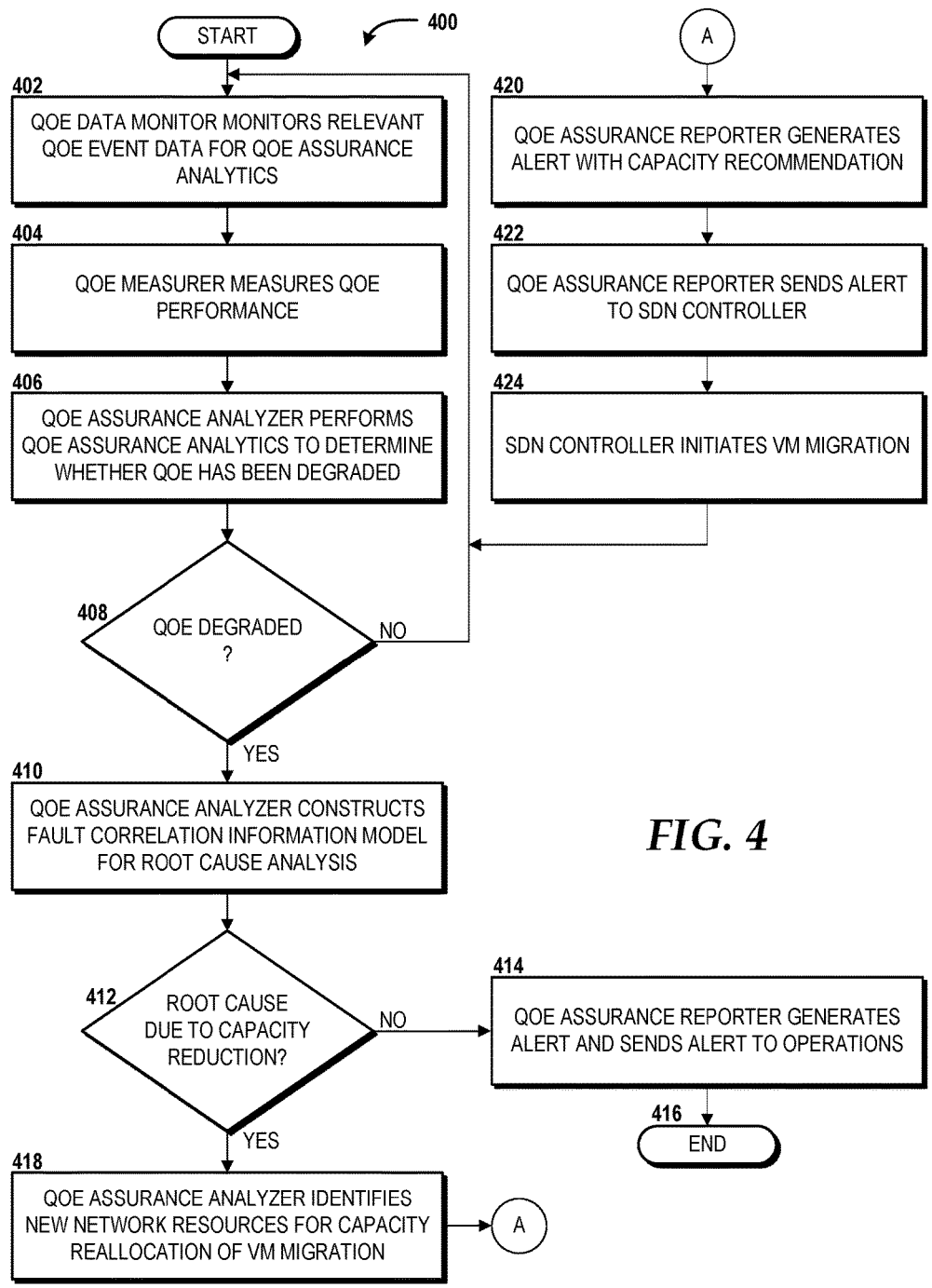
FIG. 4 is a flow diagram illustrating aspects of a method for providing QoE assurance for a video streaming service, according to an illustrative embodiment.

Turning now to FIG. 4, a method 400 for providing QoE assurance for a video streaming service will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or multiple processors of the QoE assurance DSS 102, the policy engine 108, the cloud resource orchestrator 110, the SDN controller 112, the user device(s) 116, and/or other systems and/or devices disclosed herein to perform one or more operations and/or causing the processor to direct other components of the computing system or device to perform one or more of the operations.

For purposes of illustrating and describing the concepts of the present disclosure, the methods disclosed herein will be described as being performed by components of the QoE assurance DSS 102 and the SDN controller 112 via execution of one or more software modules such as, for example, the QoE data monitor 304, the QoE measurer module 326 of the context-aware QoE analytics engine 306, the QoE assurance analyzer 328 of the context-aware QoE analytics engine 306, and the QoE assurance reporter 308. It should be understood that additional and/or alternative devices and/or network nodes can provide the functionality described herein via execution of one or more modules, applications, and/or other software including. Thus, the illustrated embodiments are illustrative, and should not be viewed as being limiting in any way.

The method 400 will be described with reference to FIG. 4 and additional reference to FIGS. 1-3. The method 400 begins at operation 402, where the QoE data monitor 304 of the QoE assurance DSS 102 monitors QoE event data received from the data collector(s) 302 to be utilized, at least in part, for QoE assurance analytics. In particular, at operation 402, the QoE data monitor 304 can monitor and extract the event data 310 and the context data 312 from the data collector(s) 302 for QoE/VRF measurement under capacity reduction conditions. The event data 310 can include data associated with an event that causes a VM execution to be suspended (i.e., the VM suspend events 314), one or more application TCA events (i.e., the application TCA events 316) that detects network throughput T 208 is lower than device's 116 video playback rate PR 214, and one or more hardware host TCA events (i.e., hardware host TCA events 318) that the capability utilization of the hardware host exceeds the designated threshold. The context data 312 can include the virtual network topology data 320 and the performance metrics 324. The virtual network topology data 320 can include a network topology that identifies associations of VNFs, VMs, and hardware hosts of one or more of the virtualized IP networks 114 (shown in FIGS. 1 and 2). The performance metrics 324 can include capacity utilization data of the hardware hosts.

From operation 402, the method 400 proceeds to operation 404, wherein the QoE measurer module 326 measures QoE performance. The QoE measurer module 326 can measure relevant QoE metric performance that reflects customer experiences. The QoE measurer module 326 can define a QoE metric in terms of VRF to measure QoE performance. VRF can equal the number of playback operations entering into a rebuffering state during video session playback. When the TCP throughput is lower than the device's playback rate (in frames per second), the video playback will pause and wait for new video data, and the operation enters into a rebuffering state. The QoE measurer module 326 also can build a counter for video rebuffering occurrences. In this manner, the QoE measurer module 326 can measure VRF by monitoring the number of video rebuffering occurrences. This measurement can be conditional for video rebuffering occurrences that are responsive to certain conditions, such as, for example, a VM suspend state and/or a TCP throughput value below threshold.

From operation 404, the method 400 proceeds to operation 406, where the QoE assurance analyzer 328 performs QoE assurance analytics to determine whether QoE has been degraded. In particular, at operation 406, the QoE assurance analyzer 328 can determine whether the VRF is less than or equal to a predetermined VRF threshold ("N"). If the QoE assurance analyzer 328 determines that the VRF is less than the predetermined VRF threshold (i.e., VRF<N), then the QoE assurance analyzer 328 can determine that the QoE has not been degraded. If, however, the QoE assurance analyzer 328 determines that the VRF is equal to or greater than the predetermined VRF threshold (i.e., VRF≥N), then the QoE assurance analyzer 328 can determine that QoE has been degraded.

From operation 406, the method 400 proceeds to operation 408, where a determination is made whether the QoE has been degraded. If the QoE has not been degraded, the method 400 returns to operation 402, where the QoE data monitor 304 of the QoE assurance DSS 102 continues to monitor relevant QoE event data for QoE assurance analytics. If, however, the QoE has been degraded, the method 400 proceeds to operation 410, where the QoE assurance analyzer 328 constructs the fault correlation information model 332 to be utilized for root cause analysis of the degradation determined at operation 408. An illustrative example of the fault correlation information model 332 will be described herein below with reference to FIG. 6. The QoE assurance analyzer 328 can build the fault correlation information model 332 using UML.

From operation 410, the method 400 proceeds to operation 412, where the QoE assurance analyzer 328 determines whether the root cause of the degradation is due to capacity reduction. The QoE assurance analyzer 328 can determine whether the root cause of the degradation is due to capacity reduction using the event data 310, the context data 312, the correlation rules 330, and the fault correlation information model 332. If, at operation 412, the QoE assurance analyzer 328 determines that the root cause of the degradation is not due to capacity reduction, the method 400 proceeds to operation 414, where the QoE assurance reporter 308 generates an alert (e.g., one of the alerts 334) indicating that the root cause of the degradation is not due to capacity reduction. Also, at operation 414, the QoE assurance reporter 308 sends the alert 334 to operations personnel who can handle root causes of the degradation other than capacity reduction. The manner in which the operations personnel handles root causes of the degradation other than capacity reduction is beyond the scope of the concepts and technologies disclosed herein. From operation 414, the method 400 proceeds to operation 416. The method 400 ends at operation 416. Alternatively, the method 400 can return to operation 402, where the QoE data monitor 304 of the QoE assurance DSS 102 continues to monitor relevant QoE event data for QoE assurance analytics.

If, at operation 412, the QoE assurance analyzer 328 determines that the root cause of the degradation is due to capacity reduction, the method 400 proceeds to operation 418, where the QoE assurance analyzer 328 identifies new network resources for capacity reallocation via VM migration. In particular, the QoE assurance analyzer 328 can select a hardware host from a resource pool in the same server cluster that has sufficient capacity for live VM migration to meet the application performance requirements to assure QoE for the video streaming service.

From operation 418, the method 400 proceeds to operation 420, where the QoE assurance reporter 308 generates an alert (e.g., one of the alerts 334) that includes a capacity recommendation (e.g., one of the recommendations 336). The capacity recommendation 336 includes data identifying hardware host selected at operation 418 as the recommended destination for live VM migration. From operation 420, the method 400 proceeds to operation 422, where the QoE assurance reporter 308 sends the alert 334 to the SDN controller 112. In addition or in the alternative, the QoE assurance reporter 308 can send the alert 334 to the policy engine 108, which can update or create one or more policies to reflect the recommended migration.

From operation 422, the method 400 proceeds to operation 424, where the SDN controller 112 initiates VM migration the recommended destination. From operation 424, the method 400 returns to operation 402, where the QoE data monitor 304 of the QoE assurance DSS 102 continues to monitor relevant QoE event data for QoE assurance analytics.

Figure 5:
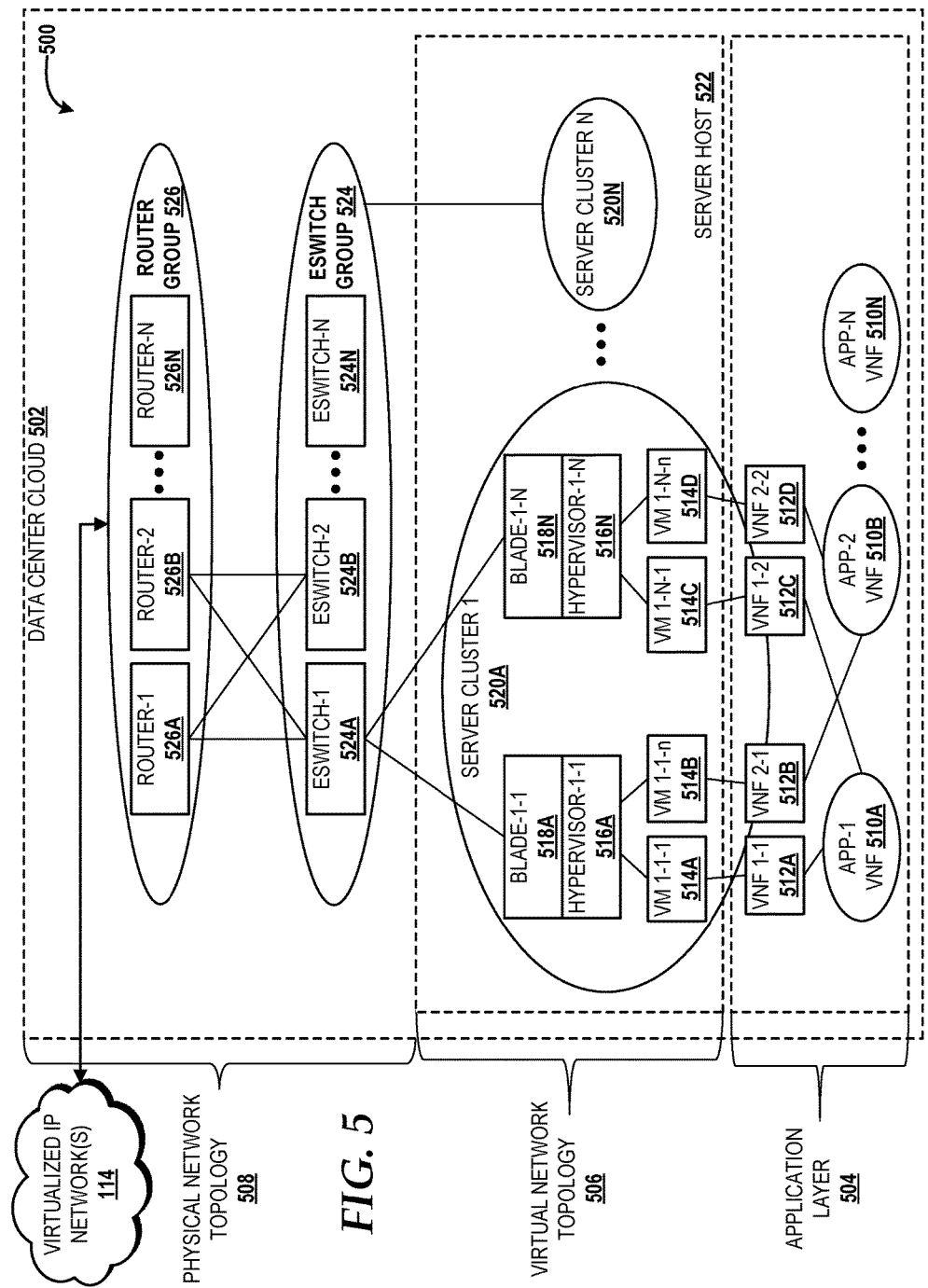
FIG. 5 is a diagram illustrating a network topology for a data center cloud, according to an illustrative embodiment.

Turning now to FIG. 5, a network topology 500 for a data center cloud 502 will be described, according to an illustrative embodiment. The illustrated network topology 500 includes three layers: an application ("APP") layer 504, a virtual network topology layer 506, and a physical network topology layer 508. The APP layer 504 can include one or more application VNFs 510A-510N, each of which can be divided to one or more sub-VNFs 512 to be executed by one or more VMs 514.

The virtual network topology layer 506 includes the VMs 514, one or more hypervisors 516, and one or more server modules ("blades") 518. Each blade 518 can support one hypervisor 516 that, in turn, can manage one or more of the VMs 514. The blades 518 provide computing capacity to support the VMs 514 carrying the VNFs 512. The hypervisors 516 provide resource management among the VMs 514 supported thereby. A logical server cluster 520 is created for resource allocation and reallocation purpose, which includes the blades 518 in the same server host 522. Each server host 522 includes one or more of the server clusters 520.

The physical network topology layer 508 includes an Ethernet switch ("ESwitch") group 524 and a router group 526. The ESwitch group 524 provides traffic switching function among the blades 518. The router group 526 provides connectivity for traffic routing between the data center cloud 502 and the virtualized IP network(s) 114. The router group 526 may or may not provide multiplexing functions, depending upon network design.

The virtual network topology 506 is dynamic by nature, and as such, the VMs 514 can be moved among the blades 518 as needed. The physical network topology 508 is more static, and as such, no dynamic resource allocation is involved in this layer. Through such a network topology configuration, the association among application VNFs 510, the VM 514 supporting the application VNFs 510, and the blades 518 that host the VM 514 can be determined.

In the illustrated example, a first VNF is divided into two sub-VNFs, VNF 1-1 512A and VNF 1-2 512C, which is executed by VM 1-1-1 514A and VM 1-N-1 514C, respectively. The VM 1-1-1 514A is hosted by the blade 1-1 518A and managed by the hypervisor 1-1 516A in the server cluster 1 520A of the server host 522. Traffic switching between the blade 1-1 518A and the blade 1-N 518N is performed via ESwitch-1 524A. Traffic communications between the ESwitch group 524 and the virtualized IP network(s) 114 are performed via the router group 526. In this example, the VM 1-1-1 514A can be moved from the blade 1-1 518A to the blade 1-N 518N for VM live migration if the blade 1-1 518A is detected to have difficulty to support the VNF 1-1 512A performance requirements and the blade 1-N 518N has sufficient capacity and is available to support the VNF 1-1 512A performance requirements. The virtual network topology 506 is dynamic by nature due to real-time resource allocation/reallocation capability of cloud SDN. The association of application, VM, and blade host in this example is the VNF 1-1 512A being executed on the VM 1-1-1 514A hosted by the blade 1-1 518A in the server cluster 1 520A.

Figure 6:
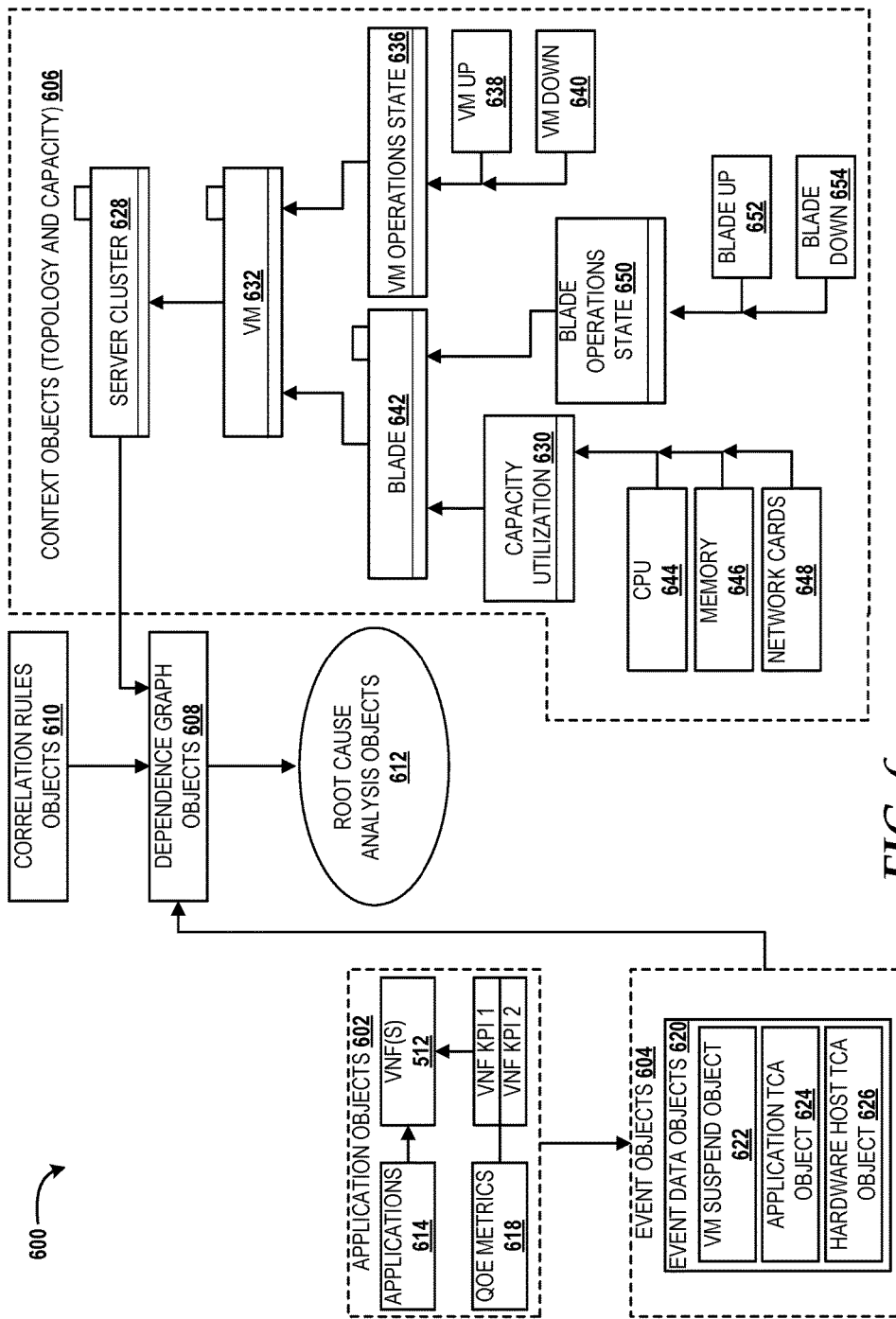
FIG. 6 is a block diagram illustrating aspects of a fault correlation information model, according to an illustrative embodiment.

Turning now to FIG. 6, an illustrative example fault correlation information model 600 will be described, according to an illustrative embodiment. The fault correlation information model 600 is an object-oriented data model shared by service assurance subsystems of a cloud SDN that, at a giving time, represents the cloud SDN virtual network topology and service view, corresponding to virtual network topology and service views, such as those shown in FIG. 5. The fault correlation information model 600 here only incorporates the virtual network topology 506 described above with reference to FIG. 5 because a goal of the fault correlation information model 600 is to identify whether the root cause of QoE degradation is due to capacity reduction of hardware hosts supporting application VM for triggering VM migration.

The fault correlation information model 600 is used for the root cause analysis of VM suspend events in terms of capacity reduction events through (a) identification of associations among application (VNF), VM supporting VNF, and blade hosting that VM; and (b) identification of capacity utilization level of the blade that hosts the application VM of interest. The fault correlation information model 600 can be implemented using object-oriented UML data model for automating correlation engine construction or reconstruction for root cause analysis. Managed objects in the fault correlation information model 600 can include one or more application objects 602, one or more event objects 604, one or more context objects 606, one or more dependence graph objects 608, one or more correlation rules objects 610, and one or more root cause analysis objects 612.

The application objects 602 can include one or more applications 614 and one or more associated VNFs 512 (best shown in FIG. 5), that support targeting services (e.g., HTTP streaming video service) and one or more QoE metrics 618 to reflect QoE for the selected service. The event objects 604 can include objects associated with the event data 310 (event data objects 620). In the illustrated example, the event data objects 620 include a VM suspend object 622, an application TCA object 624, and a hardware host TCA object 626. The event objects 604 are utilized to analyze QoE performance.

The context objects 606 include virtual network topology object classes (shown as "server cluster") 628 and hardware host's resource capacity utilization data object classes (shown as "capacity utilization") 630. The virtual network topology object classes 628 can include managed objects of the VNFs 512, the VMs 514, the hardware hosts (blades) 518, the server cluster 520, and hierarchal relationships, as shown, for example, in FIG. 5. A VM object class (shown as "VM") 632 can include objects of hardware hosts (e.g., blades 518) and VM operations state 636, which includes objects of VM up 638 and VM down 640. Each of the hardware hosts (e.g., blades 518) can host one or more VMs supporting VNFs. Each hardware host object class (shown as "blade" object class) 642 includes objects of CPU 644, memory 646, and network card 648 objects with capacity utilization objects 630 and blade operations state 650 which includes blade up 652 and blade down 654. The objects of VM and blade operations states (636, 650) are needed due to the purpose of VM migration. For the purpose of efficient resource reallocation supporting VM migration which moves VM from one host to another host having sufficient capacity to support performance requirements of VNF executed by that VM, one or more hardware hosts can be organized into a server cluster 520 and the VM 514 can be moved (migrated) to any hardware host in the same cluster 520 available to support performance requirements of VM's NVF (as shown in FIG. 5).

The dependence graph objects 608 represent a relationship covering a pair of network entities that refers to a behavioral connection therebetween. One dependency type is a "containment," where one entity is considered to be contained within another. Another dependency type is when two entities are independent of each other. For example, a VM object 632 is considered to be contained inside a blade host object 642, while event objects 604 are considered to be independent to context data objects 606. Dependency relationship is used to facilitate correlation for a particular analysis that can be correlated for a particular analytics task—here, the root cause analysis objects 612 for QoE performance degradation.

The correlation rules objects 610 include the rule set(s) running on the dependency graph objects 608 based upon the event data objects 604 and the context data objects 606 for executing a specific analytics mission—that is, the root cause analysis objects 612 for QoE performance degradation. The correlation rules objects 610 are defined as follows: (a) IF (the number of VM suspension state events=the number of TCA events), THEN check step (b); otherwise, return; (b) IF (the number of # VM suspension state events=N(VRF)), THEN check step (c); otherwise, return; (c) IF corresponding capacity utilization of one or more hardware hosts that host the degraded VM>designated utilization threshold or host TCA alarm is detected, THEN output the root cause of degraded VM is due to capacity reduction events; otherwise, return. Correlation rule (a) is to check consistency of VM layer event and application layer event due to effect of video rebuffering. Correlation rule (b) is to check whether QoE has been degraded. Correlation rule (c) is to check whether the root cause is due to capacity reduction events that enables triggers of VM migration action. The root cause analysis objects 612 is an analytics module for root cause analysis of QoE degradation using the correlation rules objects 610 and the dependence graph objects 608 to find out whether the root causes of QoE degradation is due to capacity reduction events that can be reflected by higher capacity utilization along with poor QoE performance.

Figure 7:
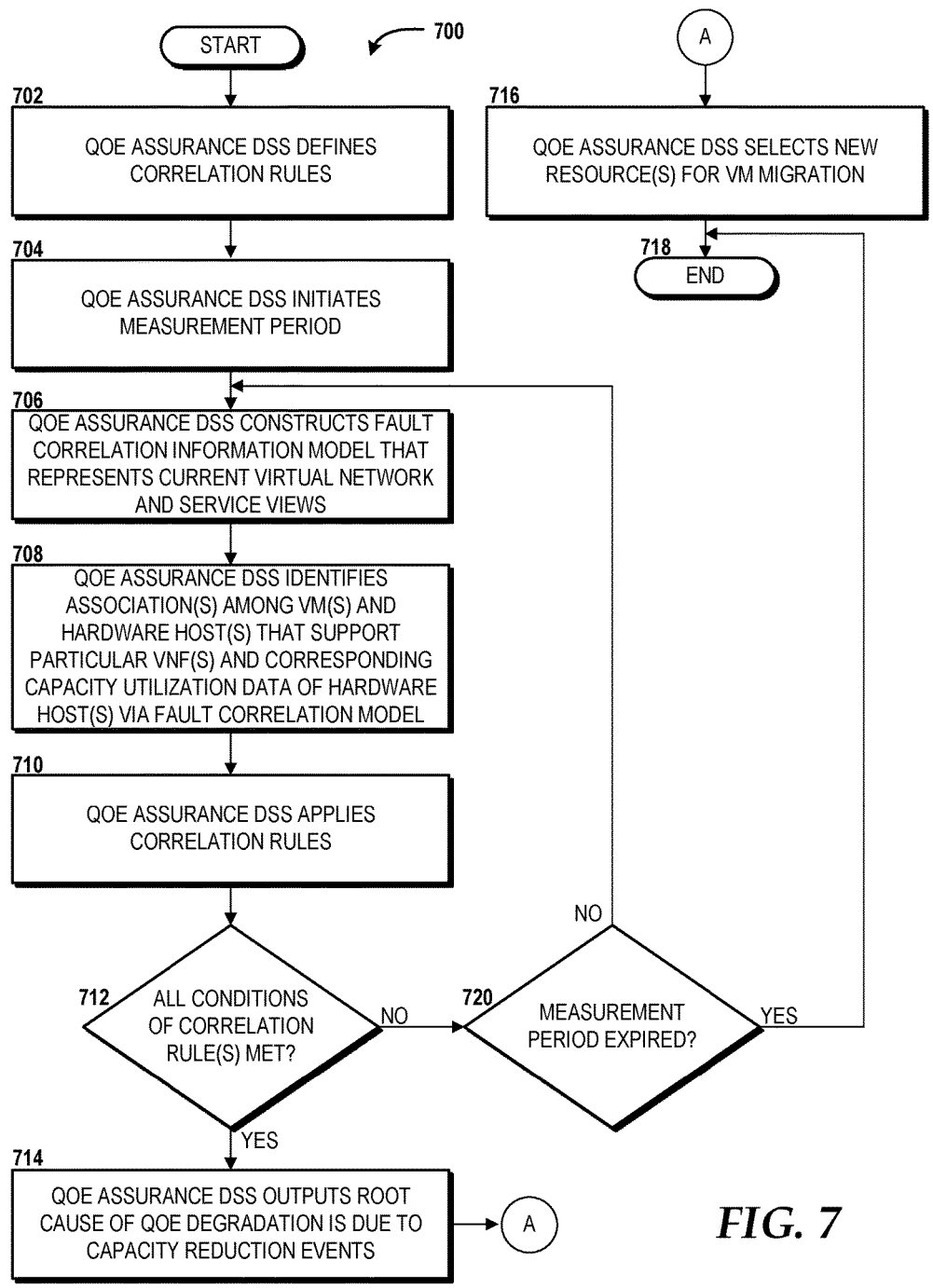
FIG. 7 is a flow diagram illustrating aspects of a method for root cause analysis using a fault correlation information model to identify the root cause of OoE degradation, according to an illustrative embodiment.

Turning now to FIG. 7, a method 700 for root cause analysis using a fault correlation information model 332 to identify the root cause of QoE degradation, according to an illustrative embodiment. The fault correlation information model 332 utilized in the method 700 will be based upon the illustrative example fault correlation information model 600 described above with reference to FIG. 6. As such, the method 700 will be described with reference to FIG. 7 and further reference to FIG. 6.

The method 700 begins and proceeds to operation 702, where the QoE assurance DSS 102 defines the correlation rules 330. The correlation rules 330 are defined as follows: (a) IF (the number of VM suspension state events=the number of TCA events), THEN check step (b); otherwise, return; (b) IF (the number of # VM suspension state events=N(VRF)), THEN check Step (c); otherwise, return; (c) IF corresponding capacity utilization of one or more hardware hosts that host the degraded VM>designated utilization threshold or host TCA alarm is detected, THEN output the root cause of degraded VM is due to capacity reduction events; otherwise, return. Correlation Rule (a) is to check consistency of VM layer event and application layer event due to effect of video rebuffering. Correlation Rule (b) is to check whether QoE has been degraded. Correlation Rule (c) is to check whether the root cause is due to capacity reduction events that enables triggers of VM migration action. From operation 702, the method 700 proceeds to operation 704, where the QoE assurance DSS 102 initiates a measurement period. From operation 704, the method 700 proceeds to operation 706, where the QoE assurance DSS 102 constructs the fault correlation information model 332 (e.g., based upon the illustrative example fault correlation information model 600 shown in FIG. 6) that represents current virtual network and service views. From operation 706, the method 700 proceeds to operation 708, where the QoE assurance DSS 102 identifies one or more associations among VM(s) and hardware host(s) that support particular VNF(s) and corresponding capacity utilization data of hardware host(s) via the fault correlation information model 332.

From operation 708, the method 700 proceeds to operation 710, where the QoE assurance DSS 102 applies the correlation rules 330. From operation 710, the method 700 proceeds to operation 712, where the QoE assurance DSS 102 determines whether all the conditions specified in the correlation rules 330 are met. In particular, the QoE assurance DSS 102 can check if all following conditions are met: (number of VM suspend events=number of application TCA events=N(VRF)) and (corresponding capacity utilization of one or more hardware hosts that host the degraded VM>designated utilization threshold or an host TCA alarm is detected). If all conditions are met, the method 700 proceeds to operation 714, where the QoE assurance DSS 102 outputs the root cause of QoE degradation is due to one or more capacity reduction events.

From operation 714, the method 700 proceeds to operation 716, wherein the QoE assurance DSS 102 selects one or more new resources for VM migration. In particular, at operation 716, the QoE assurance DSS 102 can select a hardware host (e.g., one of the blades 518) from the resource pool in the same server cluster (e.g., the server cluster 1 520A), which has the highest capacity in that server cluster to meet application performance requirements. If no alternate hardware host is available in the same cluster that meets application performance requirements, then the QoE assurance DSS 102 can select an alternate hardware host in different server cluster (e.g., server cluster N 520N) in the server host 522.

From operation 716, the method 700 proceeds to operation 718. The method 700 ends at operation 718.

If, however, at operation 712, the QoE assurance DSS 102 determines that all conditions of the correlation rules 330 have not been met, the method 700 proceeds to operation 720, where the QoE assurance DSS 102 determines whether the measurement period has expired. If so, the method 700 proceeds to operation 718, where the method 700 ends. If the measurement period has not expired, the method 700 returns to operation 706 and the method 700 proceeds as described above.

Figure 8:
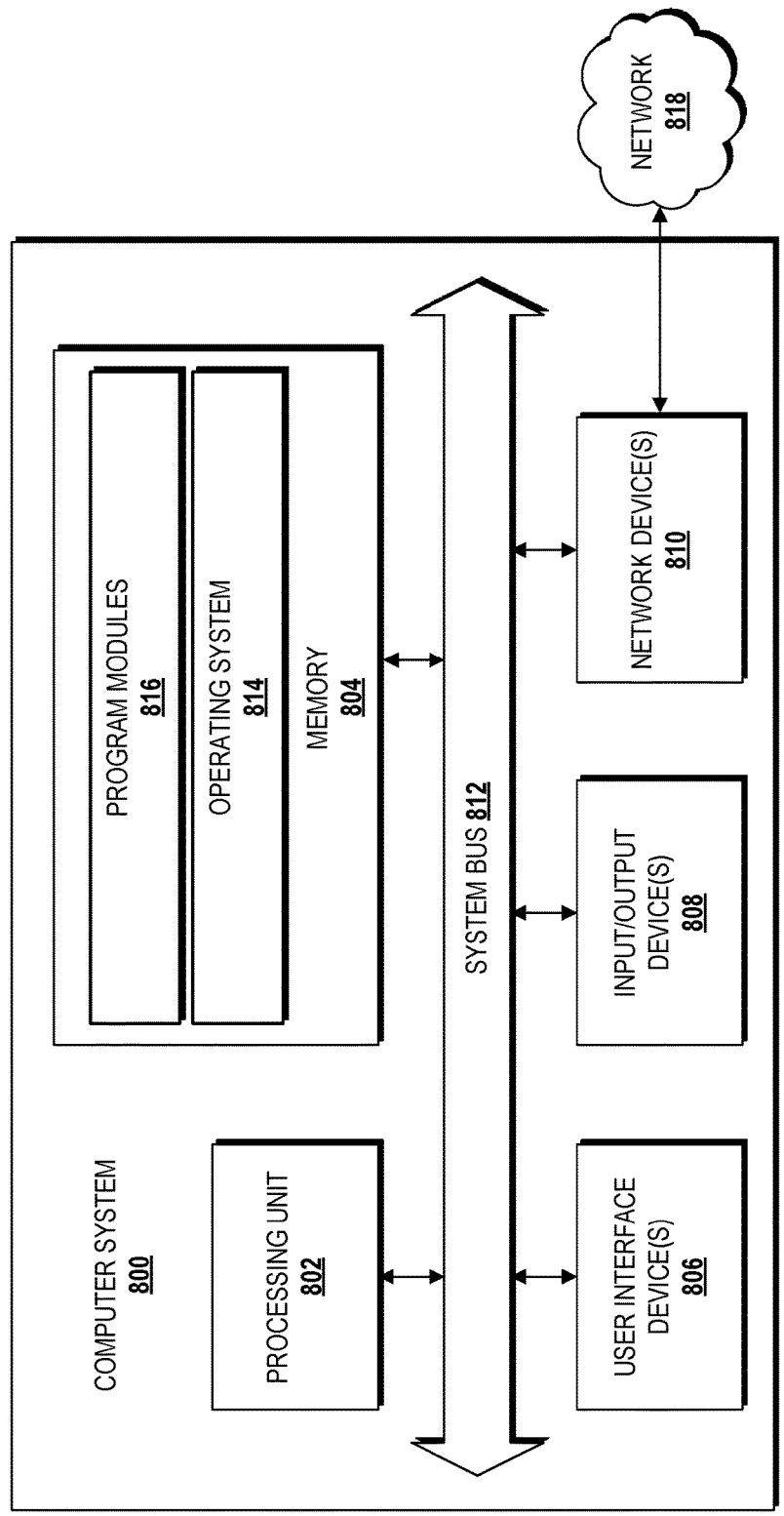
FIG. 8 is a block diagram illustrating an example computer system capable of implementing aspects of the embodiments presented herein.

Turning now to FIG. 8, a block diagram illustrating a computer system 800 configured to provide the functionality described herein for context-aware virtualized control DSS for providing quality of experience QoE assurance for IP streaming video services in accordance with various embodiments of the concepts and technologies disclosed herein. The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 802 can be a single processing unit or a multiple processing unit that includes more than one processing component. Processing units are generally known, and therefore are not described in further detail herein.

The memory 804 communicates with the processing unit 802 via the system bus 812. The memory 804 can include a single memory component or multiple memory components. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 include the QoE data monitor 304, the context-aware QoE analytics engine 306, and the QoE assurance reporter 308. This and/or other programs can be embodied in computer-readable media containing instructions that, when executed by the processing unit 802, perform the method 400 described in detail above with respect to FIG. 4. According to embodiments, the program modules 816 may be embodied in hardware, software, firmware, or any combination thereof. Although not shown in FIG. 8, it should be understood that the memory 804 also can be configured to store the event data 310, the context data 312, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network 818, such as the virtualized IP network(s) 114, and/or other networks. Examples of the network devices 810 include, but are not limited to, a modem, a radio frequency ("RF") or infrared ("IR") transceiver, a telephonic interface, a bridge, a router, or a network card. The network 818 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 818 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 9:
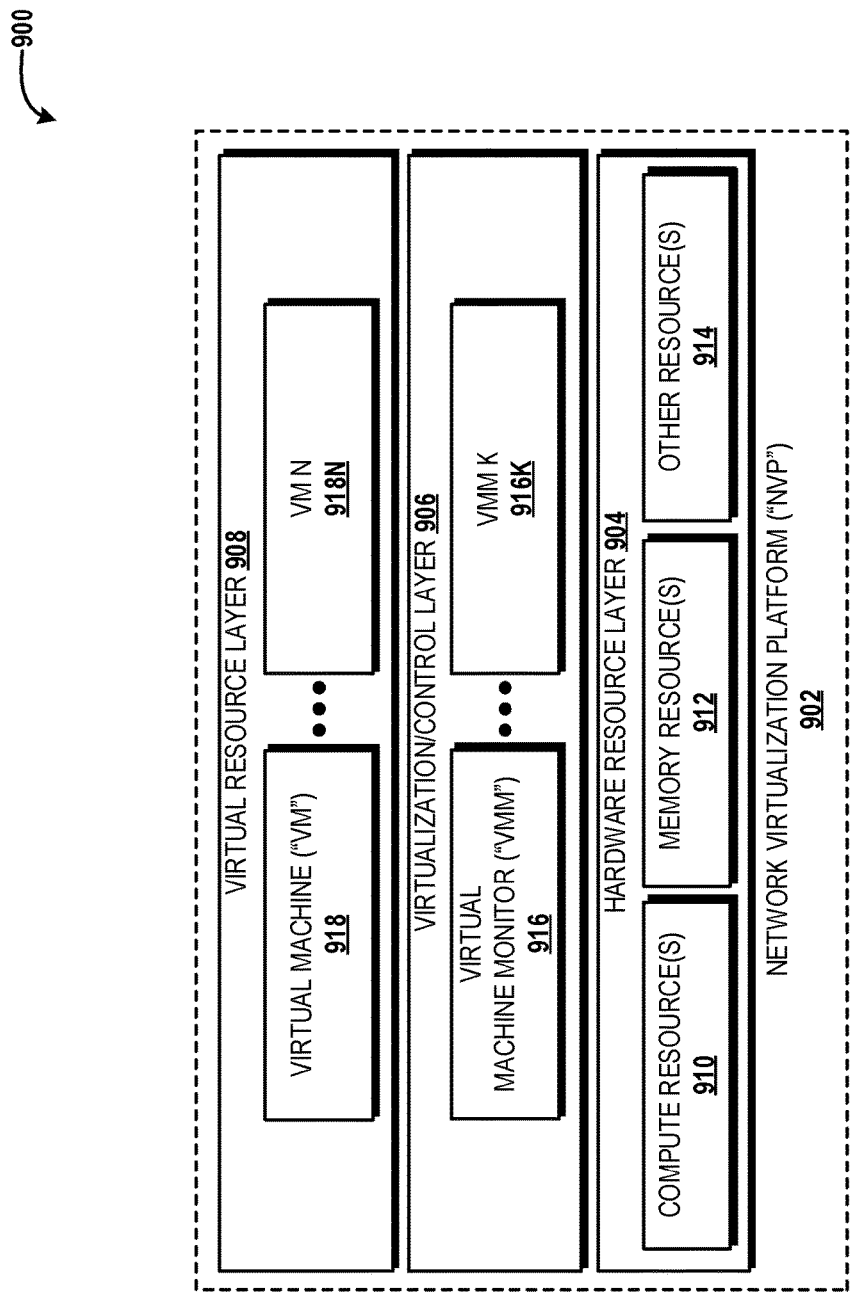
FIG. 9 is a block diagram illustrating a network virtualization platform ("NVP"), according to an illustrative embodiment.

Referring now to FIG. 9, aspects of a network virtualization platform ("NVP") 902 will be described, according to an illustrative embodiment. The NVP 902 is a shared infrastructure that can support multiple services and network applications, such as video streaming services described herein. The illustrated NVP 902 includes a hardware resource layer 904, a virtualization/control layer 906, and a virtual resource layer 908 that work together to perform operations as will be described in detail herein. While connections are shown between some of the components illustrated in FIG. 9, it should be understood that some, none, or all of the components illustrated in FIG. 9 can be configured to interact with one other to carry out various functions described herein. In some embodiments, the components are arranged so as to communicate via one or more networks (not shown). Thus, it should be understood that FIG. 9 and the following description are intended to provide a general understanding of a suitable environment in which various aspects of embodiments can be implemented, and should not be construed as being limiting in any way.

The hardware resources layer 904 provides hardware resources, which, in the illustrated embodiment, include one or more compute resources 910, one or more memory resources 912, and one or more other resources 914. The compute resource(s) 910 can include one or more hardware components that perform computations to process data, and/or to execute computer-executable instructions of one or more application programs, operating systems, and/or other software. The compute resources 910 can include one or more central processing units ("CPUs") configured with one or more processing cores. The compute resources 910 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 910 can include one or more discrete GPUs. In some other embodiments, the compute resources 910 can include CPU and GPU components that are configured in accordance with a co-processing CPU/GPU computing model, wherein the sequential part of an application executes on the CPU and the computationally-intensive part is accelerated by the GPU. The compute resources 910 can include one or more system-on-chip ("SoC") components along with one or more other components, including, for example, one or more of the memory resources 912, and/or one or more of the other resources 914. In some embodiments, the compute resources 910 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 910 can be or can include one or more hardware components architected in accordance with an ARM architecture, available for license from ARM HOLDINGS of Cambridge, United Kingdom. Alternatively, the compute resources 910 can be or can include one or more hardware components architected in accordance with an x86 architecture, such an architecture available from INTEL CORPORATION of Mountain View, Calif., and others. Those skilled in the art will appreciate the implementation of the compute resources 910 can utilize various computation architectures, and as such, the compute resources 910 should not be construed as being limited to any particular computation architecture or combination of computation architectures, including those explicitly disclosed herein.

The memory resource(s) 912 can include one or more hardware components that perform storage operations, including temporary or permanent storage operations. In some embodiments, the memory resource(s) 912 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 910.

The other resource(s) 914 can include any other hardware resources that can be utilized by the compute resources(s) 910 and/or the memory resource(s) 912 to perform operations described herein. The other resource(s) 914 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 904 can be virtualized by one or more virtual machine monitors ("VMMs") 916-916K (also known as "hypervisors"; hereinafter "VMMs 916") operating within the virtualization/control layer 906 to manage one or more virtual resources that reside in the virtual resource layer 908. The VMMs 916 can be or can include software, firmware, and/or hardware that alone or in combination with other software, firmware, and/or hardware, manages one or more virtual resources operating within the virtual resource layer 908.

The virtual resources operating within the virtual resource layer 908 can include abstractions of at least a portion of the compute resources 910, the memory resources 912, the other resources 914, or any combination thereof. These abstractions are referred to herein as virtual machines ("VMs"). In the illustrated embodiment, the virtual resource layer 908 includes VMs 918-918N (hereinafter "VMs 918"). The VMs 918 can execute one or more applications to provide one or more services, such as, for example, streaming video services.

In some embodiments, a server can include a plurality of server clusters, such as the server clusters shown in FIG. 5. Each server cluster can include one or more of the VMs 918, one or more of the VMMs 916, and a plurality of host hardware resources, such as one or more of the compute resources 910, one or more of the memory resources 912, and one or more of the other resources 914.

Based on the foregoing, it should be appreciated that concepts and technologies directed to a context-aware virtualized control DSS for providing QoE assurance for IP streaming video services have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A computer-readable storage medium having instructions stored thereon that, when executed by a processor of a quality of experience assurance decision support system, cause the quality of experience assurance decision support system to perform operations comprising:

monitoring, via a quality of experience data monitor of the quality of experience assurance decision support system, quality of experience event data and context data to be utilized for quality of experience assurance analytics;

measuring, via a quality of experience measurer of the quality of experience assurance decision support system, a quality of experience associated with a service provided by a virtual machine based upon the quality of experience event data;

performing, via a quality of experience assurance analyzer of the quality of experience assurance decision support system, the quality of experience assurance analytics;

determining, by the quality of experience assurance analyzer, whether the quality of experience assurance analytics indicate that the quality of experience associated with the service provided by the virtual machine has been degraded;

in response to determining that the quality of experience associated with the service provided by the virtual machine has been degraded, constructing, via the quality of experience assurance analyzer, a fault correlation information model to be utilized for root cause analysis to determine a root cause of the quality of experience associated with the service provided by the virtual machine being degraded;

determining, by the quality of experience assurance analyzer, based upon the fault correlation information model, whether the root cause of the quality of experience associated with the service provided by the virtual machine being degraded is due to a capacity reduction wherein determining, based upon the fault correlation information model, whether the root cause of the quality of experience associated with the service provided by the virtual machine being degraded is due to a capacity reduction comprises determining whether a number of suspend events associated with the virtual machine equals a number of threshold-crossing alarm events associated with the service provided by the virtual machine; and in response to determining that the root cause of the quality of experience associated with the service provided by the virtual machine being degraded is due to a capacity reduction, identifying, by the quality of experience assurance analyzer, a new network resource for capacity reallocation to accommodate a virtual machine migration.

2. The computer-readable storage medium of claim 1, wherein the quality of experience event data comprises data associated with the virtual machine entering a suspend state.

3. The computer-readable storage medium of claim 2, wherein the context data comprises virtual network topology data, a capacity utilization, and a throughput.

4. The computer-readable storage medium of claim 3, wherein determining, by the quality of experience assurance analyzer, whether the quality of experience assurance analytics indicate that the quality of experience associated with the service provided by the virtual machine has been degraded comprises determining, by the quality of experience assurance analyzer, whether a video rebuffering frequency is greater than or equal to a video rebuffering frequency threshold and, if so, determining that the quality of experience associated with the service provided by the virtual machine has been degraded.

5. The computer-readable storage medium of claim 4, wherein the operations further comprise generating, by a quality of experience assurance reporter, an alert directed to a software-defined network controller.

6. The computer-readable storage medium of claim 5, wherein the alert comprises a recommendation that identifies the new network resource for capacity reallocation to accommodate the virtual machine migration.

7. The computer-readable storage medium of claim 6, wherein the operations further comprise sending, by the quality of experience assurance reporter, the alert to the software-defined network controller so that the software-defined network controller can initiate the virtual machine migration to the new network resource identified in the recommendation.

8. A method comprising:

monitoring, via a quality of experience data monitor executed by a processor of a quality of experience assurance decision support system, quality of experience event data and context data to be utilized for quality of experience assurance analytics;

measuring, via a quality of experience measurer executed by the processor of the quality of experience assurance decision support system, a quality of experience associated with a service provided by a virtual machine based upon the quality of experience event data;

performing, via a quality of experience assurance analyzer executed by the processor of the quality of experience assurance decision support system, the quality of experience assurance analytics;

determining, by the quality of experience assurance analyzer, whether the quality of experience assurance analytics indicate that the quality of experience associated with the service provided by the virtual machine has been degraded;

in response to determining that the quality of experience associated with the service provided by the virtual machine has been degraded, constructing, via the quality of experience assurance analyzer, a fault correlation information model to be utilized for root cause analysis to determine a root cause of the quality of experience associated with the service provided by the virtual machine being degraded;

determining, by the quality of experience assurance analyzer, based upon the fault correlation information model, whether the root cause of the quality of experience associated with the service provided by the virtual machine being degraded is due to a capacity reduction, wherein determining, based upon the fault correlation information model, whether the root cause of the quality of experience associated with the service provided by the virtual machine being degraded is due to a capacity reduction comprises determining whether a number of suspend events associated with the virtual machine equals a number of threshold-crossing alarm events associated with the service provided by the virtual machine; and in response to determining that the root cause of the quality of experience associated with the service provided by the virtual machine being degraded is due to a capacity reduction, identifying, by the quality of experience assurance analyzer, a new network resource for capacity reallocation to accommodate a virtual machine migration.

9. The method of claim 8, wherein the quality of experience event data comprises data associated with the virtual machine entering a suspend state.

10. The method of claim 9, wherein the context data comprises virtual network topology data, a capacity utilization, and a throughput.

11. The method of claim 10, wherein determining, by the quality of experience assurance analyzer, whether the quality of experience assurance analytics indicate that the quality of experience associated with the service provided by the virtual machine has been degraded comprises determining, by the quality of experience assurance analyzer, whether a video rebuffering frequency is greater than or equal to a video rebuffering frequency threshold and, if so, determining that the quality of experience associated with the service provided by the virtual machine has been degraded.

12. The method of claim 11, further comprising generating, by a quality of experience assurance reporter, an alert directed to a software-defined network controller.

13. The method of claim 12, wherein the alert comprises a recommendation that identifies the new network resource for capacity reallocation to accommodate the virtual machine migration.

14. The method of claim 13, further comprising sending, by the quality of experience assurance reporter, the alert to the software-defined network controller so that the software-defined network controller can initiate the virtual machine migration to the new network resource identified in the recommendation.

15. A quality of experience assurance decision support system comprising:
    a processor;
    a memory that stores a plurality of modules comprising instructions that, when executed by the processor, cause the quality of experience assurance decision support system to perform operations comprising
        monitoring, via a quality of experience data monitor module of the plurality of modules, quality of experience event data and context data to be utilized for quality of experience assurance analytics,
        measuring, via a quality of experience measurer module of the plurality of modules, a quality of experience associated with a service provided by a virtual machine based upon the quality of experience event data,
        performing, via a quality of experience assurance analyzer module of the plurality of modules, the quality of experience assurance analytics,
        determining, via the quality of experience assurance analyzer module, whether the quality of experience assurance analytics indicate that the quality of experience associated with the service provided by the virtual machine has been degraded,
        in response to determining that the quality of experience associated with the service provided by the virtual machine has been degraded, constructing, via the quality of experience assurance analyzer module, a fault correlation information model to be utilized for root cause analysis to determine a root cause of the quality of experience associated with the service provided by the virtual machine being degraded,
        determining, by the quality of experience assurance analyzer module, based upon the fault correlation information model, whether the root cause of the quality of experience associated with the service provided by the virtual machine being degraded is due to a capacity reduction, wherein determining, based upon the fault correlation information model, whether the root cause of the quality of experience associated with the service provided by the virtual machine being degraded is due to a capacity reduction comprises determining whether a number of suspend events associated with the virtual machine equals a number of threshold-crossing alarm events associated with the service provided by the virtual machine, and
        in response to determining that the root cause of the quality of experience associated with the service provided by the virtual machine being degraded is due to a capacity reduction, identifying, by the quality of experience assurance analyzer module, a new network resource for capacity reallocation to accommodate a virtual machine migration.

16. The quality of experience assurance decision support system of claim 15, wherein the quality of experience event data comprises data associated with the virtual machine entering a suspend state.

17. The quality of experience assurance decision support system of claim 16, wherein the context data comprises virtual network topology data, a capacity utilization, and a throughput.

18. The quality of experience assurance decision support system of claim 17, wherein determining, by the quality of experience assurance analyzer module, whether the quality of experience assurance analytics indicate that the quality of experience associated with the service provided by the virtual machine has been degraded comprises determining, by the quality of experience assurance analyzer module, whether a video rebuffering frequency is greater than or equal to a video rebuffering frequency threshold and, if so, determining that the quality of experience associated with the service provided by the virtual machine has been degraded.

19. The quality of experience assurance decision support system of claim 18, wherein the operations further comprise generating, by a quality of experience assurance reporter module of the plurality of modules, an alert directed to a software-defined network controller, wherein the alert comprises a recommendation that identifies the new network resource for capacity reallocation to accommodate the virtual machine migration.

20. The quality of experience assurance decision support system of claim 19, wherein the operations further comprise sending, by the quality of experience assurance reporter module, the alert to the software-defined network controller so that the software-defined network controller can initiate the virtual machine migration to the new network resource identified in the recommendation.

* * * * *